(12) United States Patent
Tsuchiya

(10) Patent No.: US 6,889,928 B2
(45) Date of Patent: May 10, 2005

(54) LEADER BLOCK ROTARY MECHANISM FOR CARTRIDGE MAGNETIC TAPE DEVICE

(75) Inventor: Manabu Tsuchiya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/757,470

(22) Filed: Jan. 15, 2004

(65) Prior Publication Data

US 2004/0144878 A1 Jul. 29, 2004

(30) Foreign Application Priority Data

Jan. 16, 2003 (JP) ........................................ 2003-008312

(51) Int. Cl.$^7$ ............................................. G11B 15/66
(52) U.S. Cl. ................................. 242/332.4; 360/137
(58) Field of Search ......................... 242/332.4, 332.8, 242/532.1, 582; 360/95, 137

(56) References Cited

U.S. PATENT DOCUMENTS

| | | | | | |
|---|---|---|---|---|---|
| 4,399,936 | A | * | 8/1983 | Rueger | 242/332.4 |
| 4,704,645 | A | * | 11/1987 | Murphy et al. | 242/332.4 |
| 4,828,201 | A | * | 5/1989 | Smith | 242/332.4 |
| 5,155,639 | A | * | 10/1992 | Platter et al. | 242/332.4 |
| 6,320,722 | B1 | | 11/2001 | Tsuchiya et al. | |
| 6,322,014 | B1 | * | 11/2001 | Nemeth | 242/332.4 |
| 6,378,796 | B1 | * | 4/2002 | Hamming et al. | 242/332.4 |
| 6,471,150 | B1 | | 10/2002 | Tsuchiya et al. | |
| 6,626,387 | B1 | * | 9/2003 | Hamming | 242/332.4 |

FOREIGN PATENT DOCUMENTS

| | | |
|---|---|---|
| JP | 04-076849 | 3/1992 |
| JP | 06-267160 | 9/1994 |
| JP | 2001-118305 | 4/2001 |
| JP | 2001-135003 | 5/2001 |

* cited by examiner

*Primary Examiner*—William A. Rivera
(74) *Attorney, Agent, or Firm*—Foley & Lardner LLP

(57) ABSTRACT

Provided is a leader block rotary mechanism for a cartridge magnetic tape device, which allows over-rotation of a rotator cam in the capture direction by providing an over-rotation limiting device in a rotator cam so that damages on mechanism parts and motors due to over-rotation of the rotator cam can be prevented. Over-rotation of the rotator cam can be facilitated so that fine adjustment in the rotation amount of the loader cam gear and the rotator cam becomes unnecessary. Further, there is no abnormal capture operation generated even when there is over or less rotation of the rotator cam. The rotator cam is forcibly rotated by a release cam in the release direction through reverse rotation of the loader cam gear so as to prevent the rotation from being stuck at the time of release.

7 Claims, 15 Drawing Sheets

PRIOR ART

PRIOR ART

LEADER BLOCK ROTARY MECHANISM FOR CARTRIDGE MAGNETIC TAPE DEVICE

BACKGROUND OF THE INVENTION

1. Field of the Invention

The present invention relates to improvements in a leader block rotary mechanism for a cartridge magnetic tape device.

2. Description of the Related Art

A leader block rotary mechanism for a cartridge magnetic tape device has a configuration in which a leader pin of the magnetic tape is captured or released by rotating the leader block. This type of the leader block rotary mechanism for a cartridge magnetic tape device is disclosed, for example, in Japanese Unexamined Patent Publication No. 2001-135003.

FIG. 1 and FIG. 2 show schematic views of the structure of a conventional leader block rotary mechanism and FIG. 3 and FIG. 4 show the operational principle. Specifically, FIG. 3 shows the leader block rotary mechanism from the top-face side and FIG. 4 shows it from the bottom-face side.

In the conventional leader block rotary mechanism, first, a leader block 13 is moved to be set in the capture position. In the set state, a groove 13-1 of the leader block 13 is to be engaged with a projection 14-1 of a retractor table 14 which is freely rotatable.

When capturing a leader pin of the magnetic tape by the leader block 13, the linear motion of a retractor cam 15 is converted to the rotary motion of a retractor table 14 by, as shown in FIG. 3A to FIG. 3C and FIG. 4A to FIG. 4C, pressing the retractor table 14 against the retractor cam 15 in the F direction in the figure. By this rotary motion, the leader block 13 engaged with the retractor table 14 is rotated. According to the series of operations, the leader pin of the magnetic tape is captured by a hook part 13-2 of the leader block 13.

Further, when releasing the leader pin from the hook part 13-2, the inverse operation is carried out. That is, the retractor cam 15 is moved in the direction opposite to the F direction so that the leader block 13 is rotated by the tensile force of a spring 16 energizing to rotate the leader block 13 in the release direction. Thereby, the hook part 13-2 of the leader block 13 is released from the leader pin of the magnetic tape.

In the above-described conventional art, the rotation angle of the leader block 13, which is necessary for capturing/releasing the hook part 13-2 to/from the leader pin of the magnetic tape, depends on the sliding stroke of the retractor cam 15. Therefore, there may cause mis-capture of the leader pin or damages on mechanism parts due to over/less rotation of the leader block 13 depending on how the sliding stroke of the retractor cam 15 is adjusted.

As for the capture operation, the retractor cam 15 is forcibly pressed against the protruded part of the retractor table 14 so as to convert the linear motion of the retractor cam 15 to the rotary motion of the retractor table 14. Thus, the excessive force generated at the time of converting the linear motion to the rotary motion cannot be absorbed. Hence, mechanism parts may be damaged when the rotation of the leader block 13 is stuck due to unexpected reasons.

Further, as for the release operation, the rotary motion for returning the leader block 13 to the original position relies only on the tensile force of the spring 16. Therefore, rotation of the leader block 13 is easily stuck so that there may be cases where the leader pin cannot be released.

SUMMARY OF THE INVENTION

The object of the present invention is to provide a leader block rotary mechanism for a cartridge magnetic tape device, which can solve the shortcomings of the above-described conventional art, can prevent beforehand mis-capture of the leader pin caused by over/less rotation of the leader block and damages on mechanism parts caused by over-rotation of the leader block, and also can surely perform the release operation of the leader pin.

In order to achieve the foregoing object, the leader block rotary mechanism for a cartridge magnetic tape device according to the present invention comprises: a leader block having a hook part for capturing a leader pin of a magnetic tape housed in a cartridge; a leader block picker for capturing the leader pin onto the hook part by holding and rotating the leader block set in a position for capturing the leader pin; a rotator lever integrally rotating with the leader block picker; a rotator cam for driving to rotate the rotator lever; a loader cam gear for driving to rotate the rotator cam. In the leader block rotary mechanism, the rotator cam, while comprising an over-rotation limiting device, is constantly energized to rotate in the direction where the leader pin is released from the hook part so as to give torque to the rotator lever in the release direction; the over-rotation limiting device transmits the torque of the rotator cam in the capture direction to the rotator lever and also allows rotation of the rotator cam while keeping the rotator lever, the leader block picker and the leader block at the rotation end position; and the loader cam gear, by forward rotation, rotates the rotator cam in the capture direction in resistance to the torque given to the rotator cam in the release direction.

In the present invention, by rotating the loader cam gear in the forward direction, the rotator cam, in accordance with the rotation of the loader cam gear, is rotated in the capture direction in resistance to the rotation energizing force.

By rotating the rotator cam in the capture direction, the rotator lever is rotated integrally with the leader block picker in the capture direction. In accordance with the motion, the leader pin of the magnetic tape is engaged with (captured) the hook part of the leader block.

When the rotator cam over-rotates for some reasons or when rotation of the rotator lever is interrupted due to a stuck or the like occurred at the time of capturing the leader pin, the over-rotation limiting device allows the rotation of the rotator cam while keeping the rotator lever, the leader block picker and the leader block in the rotation end position. As described, the excessive force worked on the mechanism parts is absorbed by the over-rotation limiting device so that the damages on the mechanism parts can be surely prevented.

Thereby, design for overrotating can be realized so that fine adjustment in the rotation amount of the loader cam gear and the rotator cam becomes unnecessary. Furthermore, mis-capture of the leader pin due to over/less rotation of the rotator cam can be overcome.

Further, it is desirable that the loader cam gear be provided with a function of, by reverse rotation, forcibly rotating the rotator cam in the release direction.

With the structure, the rotator cam can be forcibly rotated in the release direction by the reverse rotation of the loader cam gear. Therefore, even in the case where the rotation energizing force by the energizing device of the rotator cam becomes relatively insufficient because the rotation is stuck or the like at the time of release, the rotator cam can be surely rotated in the release direction. Thus, the projection in the tip of the rotator lever is pressed by the fist projection of the rotator cam so that the leader block is precisely rotated in the release direction through the rotator lever and the leader block picker, which enables to release the hook part in the tip of the leader block from the leader pin of the magnetic tape.

Specifically, the rotator cam can be in the structure comprising: a first projection engaging with a projection in the tip of the rotator lever from the direction of releasing the rotator lever; the over-rotation limiting device mounted on the rotator cam for holding the projection in the tip of the rotator lever along with the first projection by being elastically engaged with the projection of the rotator lever from the capture direction of the rotator lever; and a second projection slidably in contact with the loader cam gear.

Also, the loader cam gear can be in the structure comprising a capture cam which comes to be slidably in contact with the second projection by forward rotation of the loader cam gear so as to rotate the rotator cam in the capture direction.

Further, the loader cam gear can be in the structure comprising a release cam which comes to be slidably in contact with the second projection by reverse rotation of the loader cam gear so as to rotate the rotator cam in the release direction.

With the structure, when the loader cam gear is rotated in the forward direction, the capture cam of the loader cam gear becomes slidably in contact with the second projection of the rotator cam and rotates the rotator cam in the capture direction in resistance to the rotation energizing force.

By the rotation of the rotator cam in the capture direction, the over-rotation limiting device provided on the rotator cam presses the projection of the rotator lever and rotates the leader block in the capture direction through the rotator lever and the leader block picker. Thereby, the leader pin of the magnetic tape is engaged with (captured) the hook part of the leader block.

Therefore, the above-described effect can be achieved.

Further, when the release cam is also provided in the outer periphery of the loader cam gear, the rotator cam may have a structure in which the second projection is set in a rotating position capable of abutting onto the release cam at the stage where the first projection of the rotator cam comes to be in contact in the first place with the projection in the tip of the rotator lever from the rotation direction at the time of release.

Even when the rotation is stuck at the time of release, the rotation itself of the rotator cam is unrestricted until the first projection comes to be in contact with the projection in the tip of the rotator lever from the rotating direction at the time of the release. Thus, the rotator cam can be rotated in the release direction only through the rotation energizing force by the energizing device irrespective of whether or not the rotation is stuck. Accordingly, with the structure in which the second projection of the rotator cam abuts onto the release cam under this state, the rotator cam can be surely rotated in the release direction, in resistance to the resisting force which causes the rotation to be stuck, by the torque of the loader cam gear for releasing the hook part in the tip of the leader block from the leader pin of the magnetic tape.

The over-rotation limiting device can be formed with a helical torsion coil spring whose coil part is supported on the rotation center of the rotator cam and one end is fixed to the rotator cam.

When the rotator cam is over-rotated or when rotation of the rotator lever is interrupted due to a stuck or the like occurred at the time of capturing the leader pin, the coil part of the helical torsion coil spring elastically bends for allowing the rotation of the rotator cam, thereby releasing the excessive force.

BRIEF DESCRIPTION OF THE DRAWINGS

FIG. 5A is a fragmentary sectioned view showing the cartridge from the side face and FIG. 5B shows the cartridge from the face with an ejection port of the magnetic tape;

DETAILED DESCRIPTION OF THE PREFERRED EMBODIMENTS

Figure 1:
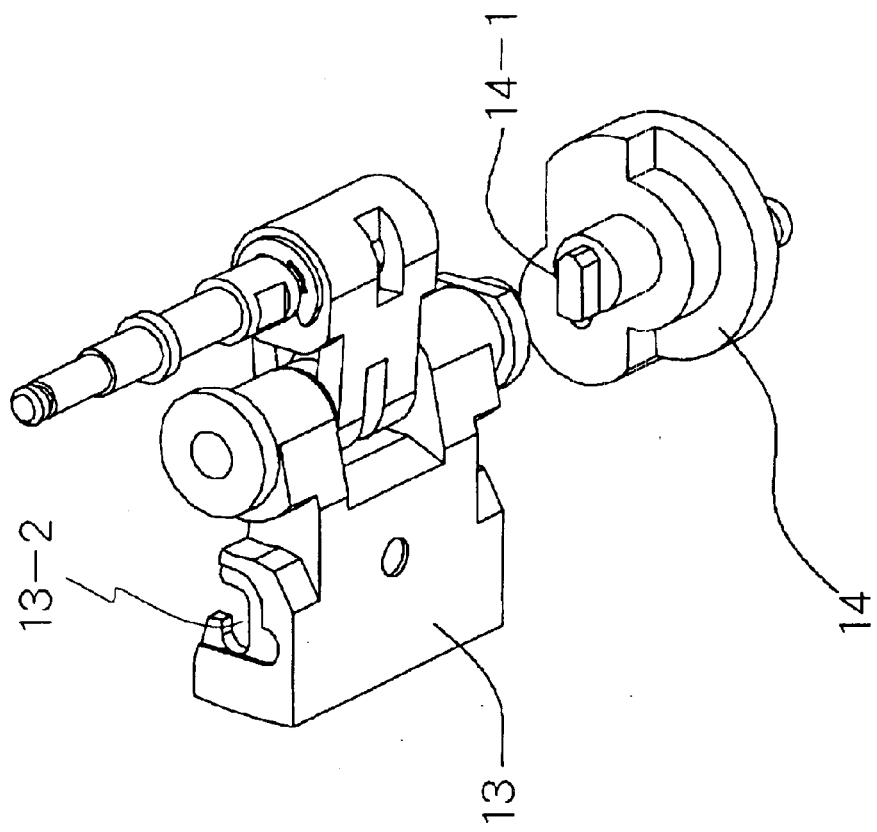
FIG. 1 is a perspective view showing the structure of a conventional leader block rotary mechanism.
Figure 2:
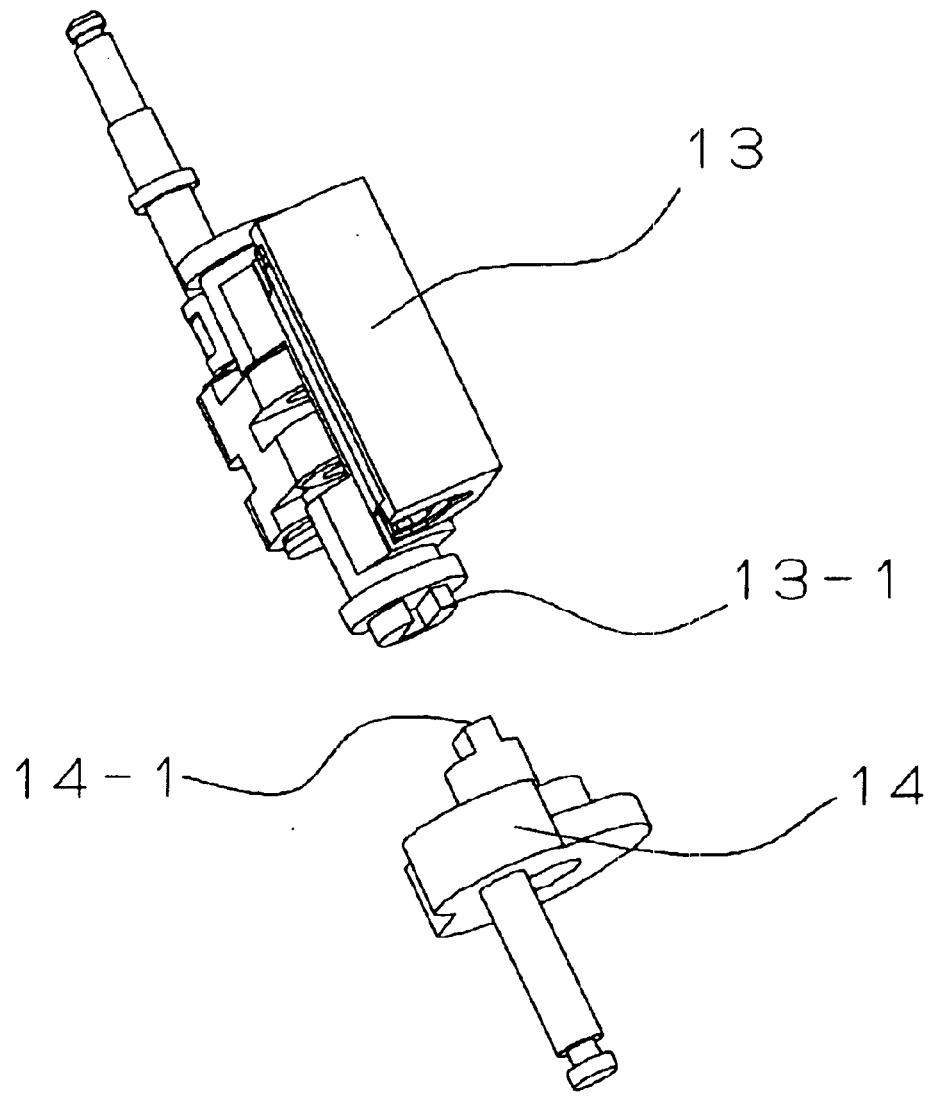
FIG. 2 is a perspective view showing the structure of the conventional leader block rotary mechanism taken from another direction.
Figure 3A:
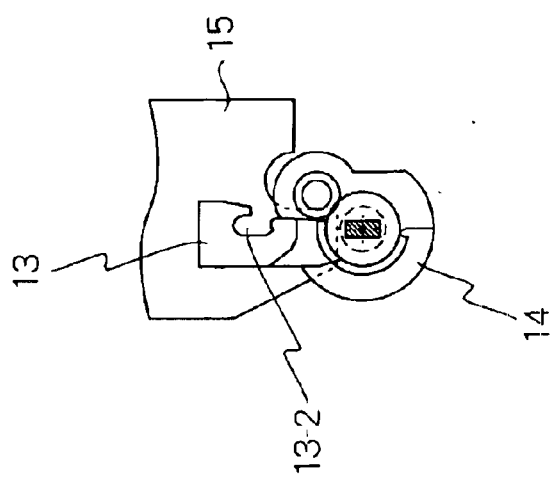
FIGS. 3A–3C are schematic illustrations showing the operation principle of the conventional leader block rotary mechanism.
Figure 3B:
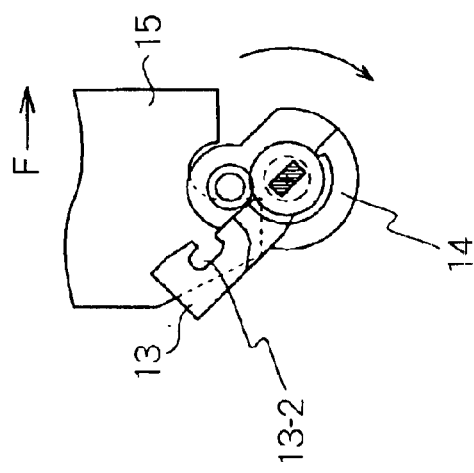
Figure 3C:
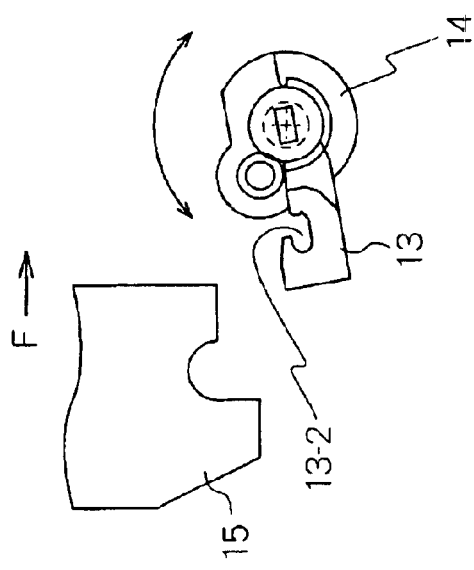
Figure 4A:
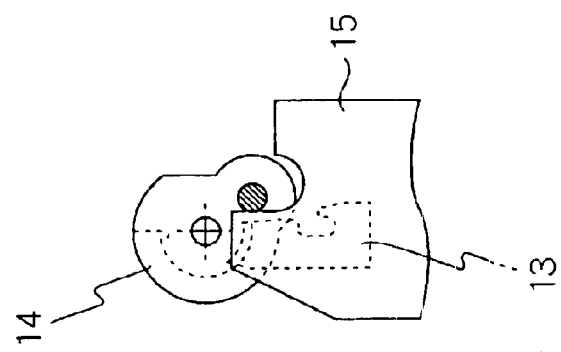
FIGS. 4A–4C are schematic illustrations showing the operation principle of the conventional leader block rotary mechanism taken from another direction.
Figure 4B:
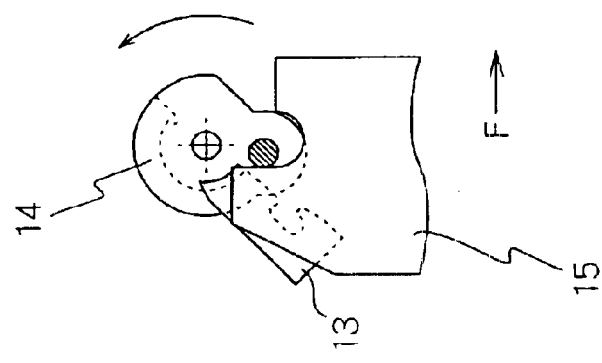
Figure 4C:
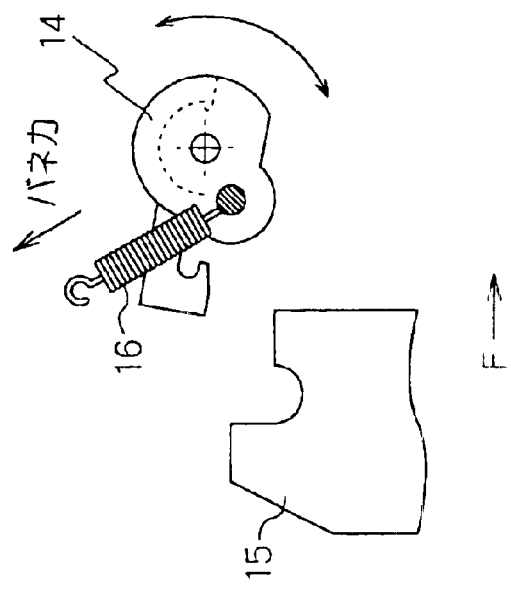

A preferred embodiment of the present invention will be described hereinafter by referring to accompanying drawings.

The leader block rotary mechanism for the cartridge magnetic tape device according to the present invention basically comprises: a leader block 12 with a hook part 12-2 for capturing a leader pin 1-2 of a magnetic tape 1-1 housed in a cartridge 1; a leader block picker 11 for capturing the leader pin 1-2 onto the hook part 12-2 by holding and rotating the leader block 12 set in the position for capturing the leader pin 1-2; a rotator lever 10 which integrally rotates with the leader block picker 11; a rotator cam 7 for driving to rotate the rotator lever 10; and a loader cam gear 5 for driving to rotate the rotator cam 7.

The rotator cam 7 is constantly forced to rotate in the direction of releasing the leader pin 1-2 from the hook part 12-2 thereby giving torque to the rotator lever 10 in the release direction. It also comprises an over-rotation limiting device (9).

The over-rotation limiting device (9) transmits the torque of the rotator cam 7 in the capture direction to the rotator lever 10 and also allows rotation of the rotator cam while keeping the rotator lever 10, the leader block picker 11 and the leader block 12 in the rotation end position.

The loader cam gear 5, by the forward rotation, rotates the rotator cam 7 in the capture direction in resistance to the torque applied to the rotator cam 7 in the release direction.

In the present invention, upon rotating the loader cam gear, the rotator cam rotates in the capture direction in resistance to the rotation energizing force according to the rotation of the loader cam gear.

By the rotation of the rotator cam 7 in the capture direction, the rotator lever 10 integrally rotates with the leader block picker 11 in the capture direction. According to this motion, the leader pin 1-2 of the magnetic tape 1-1 is engaged (captured) with the hook part 12-2 of the leader block 12.

Here, in the case where the rotator cam 7 excessively rotates for some reasons or rotation of the rotator lever 10 at the time of capturing the leader pin 1-2 is interrupted by a stuck or the like, the over-rotation limiting device allows the rotator cam 7 to rotate while keeping the rotator lever 10, the leader block picker 11 and the leader block 12 in the present position (rotation end position).

Figure 5A:
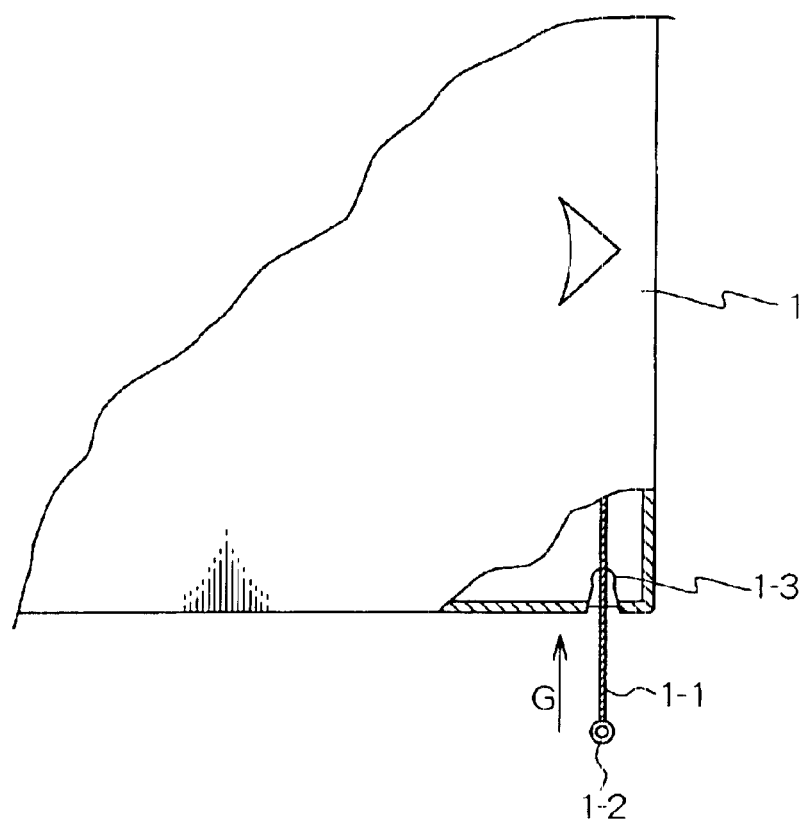
FIGS. 5A–5B are illustrations showing the main part in the structure of a single cartridge used in a cartridge magnetic tape device, where
Figure 5B:
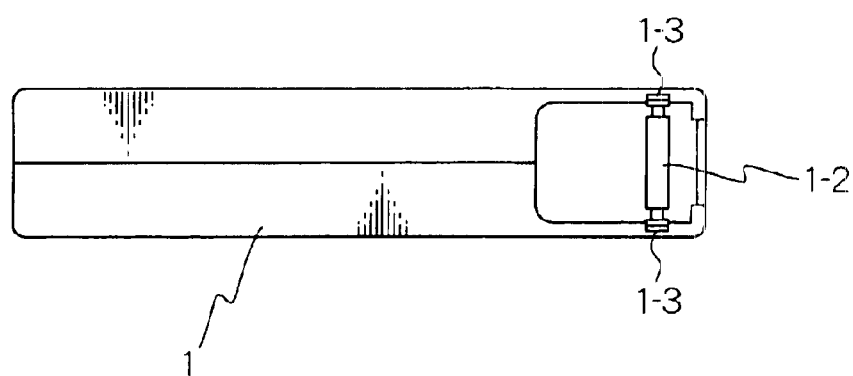

Further, the embodiment of the present invention will be described in detail. As shown in FIG. 5A and FIG. 5B, the cartridge 1 encloses the magnetic tape 1-1 and the leader pin 1-2 is provided on the tip of the magnetic tape 1-1. The leader pin 1-2 is engaged with pin fixing grooves 1-3 provided on both sides of the inner wall of the cartridge 1 in the G direction.

Figure 6:
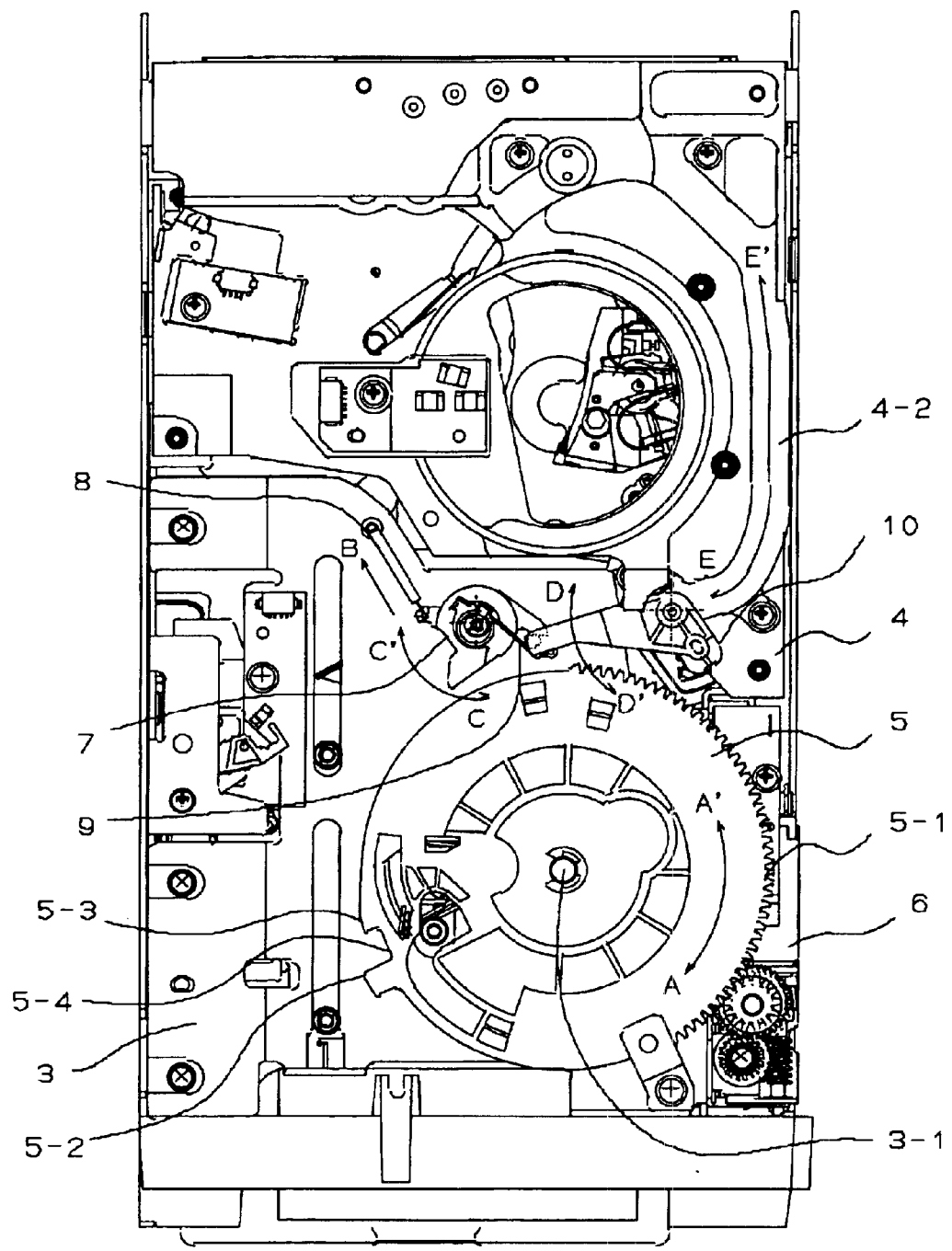
FIG. 6 is a plan view showing a casing part of a cartridge magnetic tape device according to a first embodiment to which the present invention is applied (the state before proceeding to the capture operation)
Figure 7:
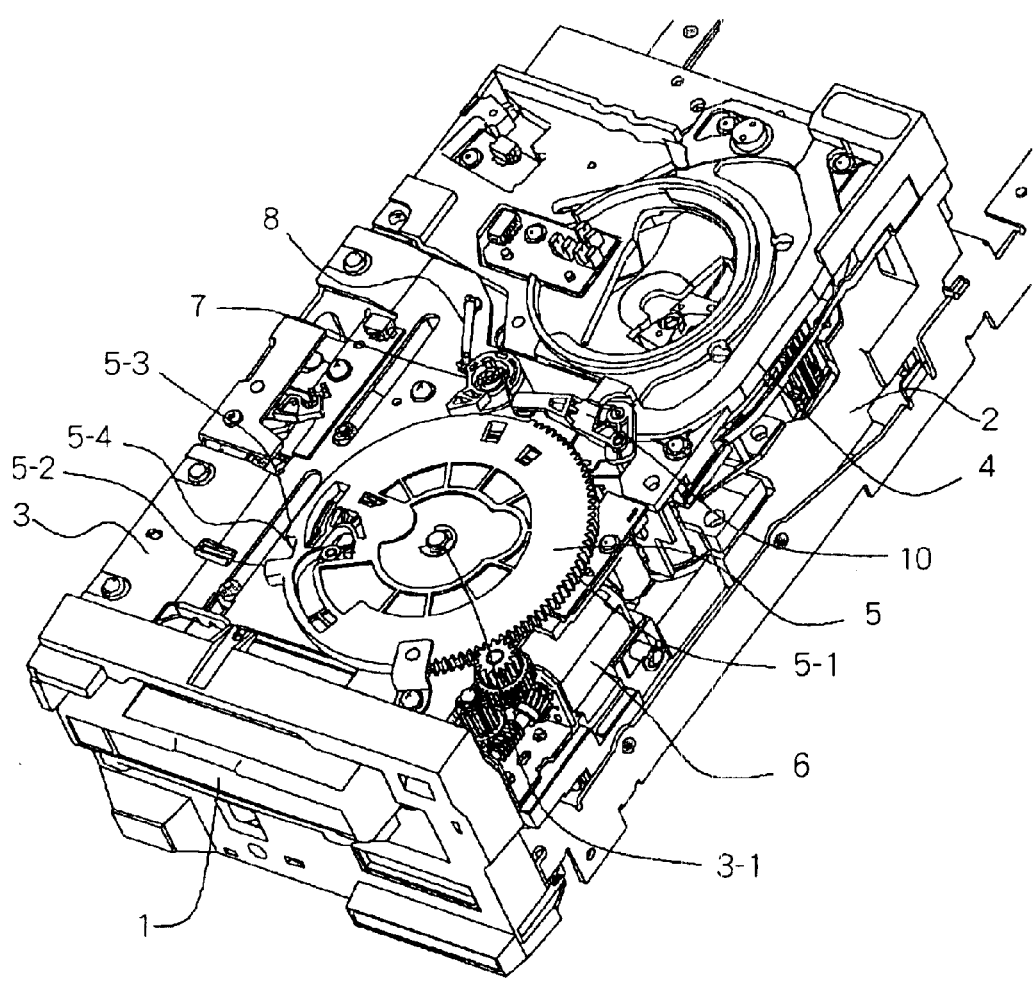
FIG. 7 is a perspective view showing the cartridge magnetic tape device according to the embodiment (the state before proceeding to the capture operation)
Figure 8:
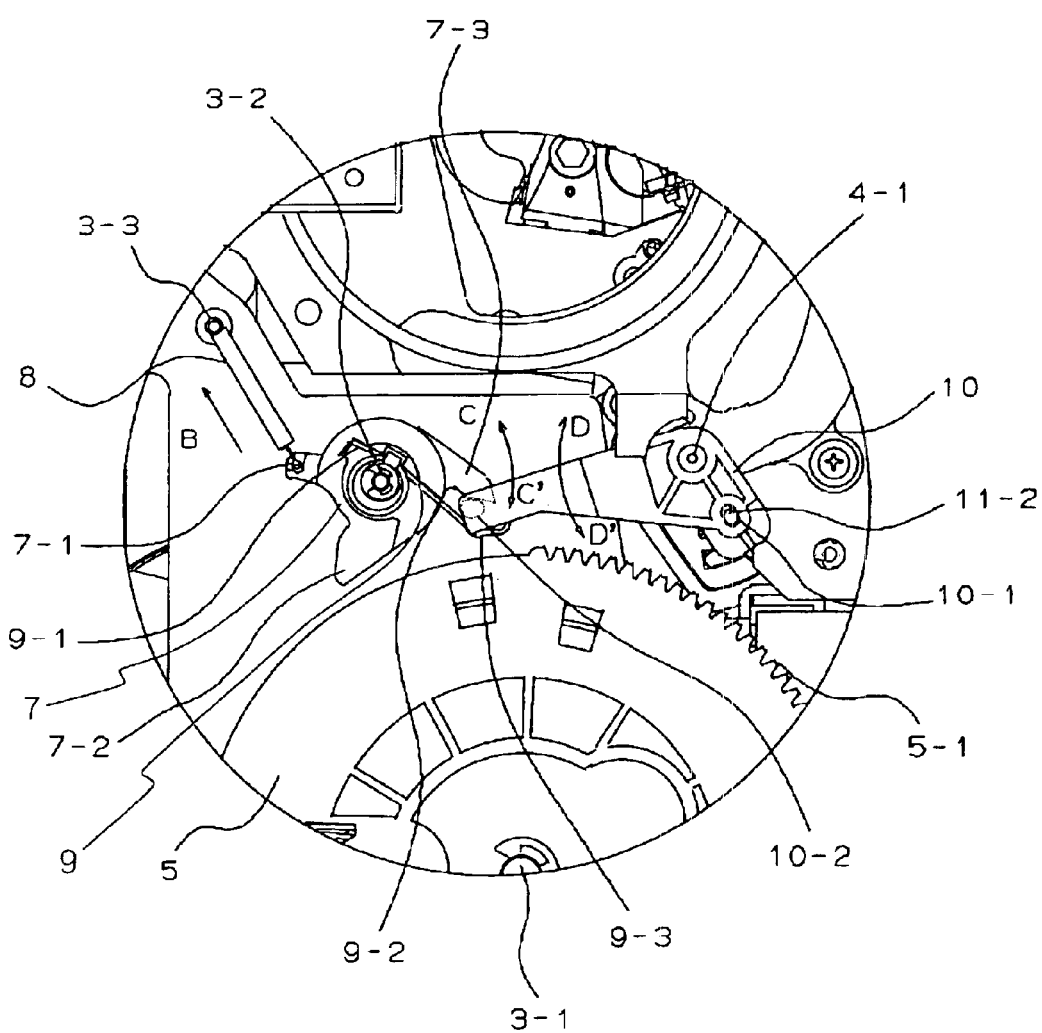
FIG. 8 is an enlarged view showing the structure in the periphery of the rotator cam of the cartridge magnetic tape device according to the embodiment (the state before proceeding to the capture operation)
Figure 9:
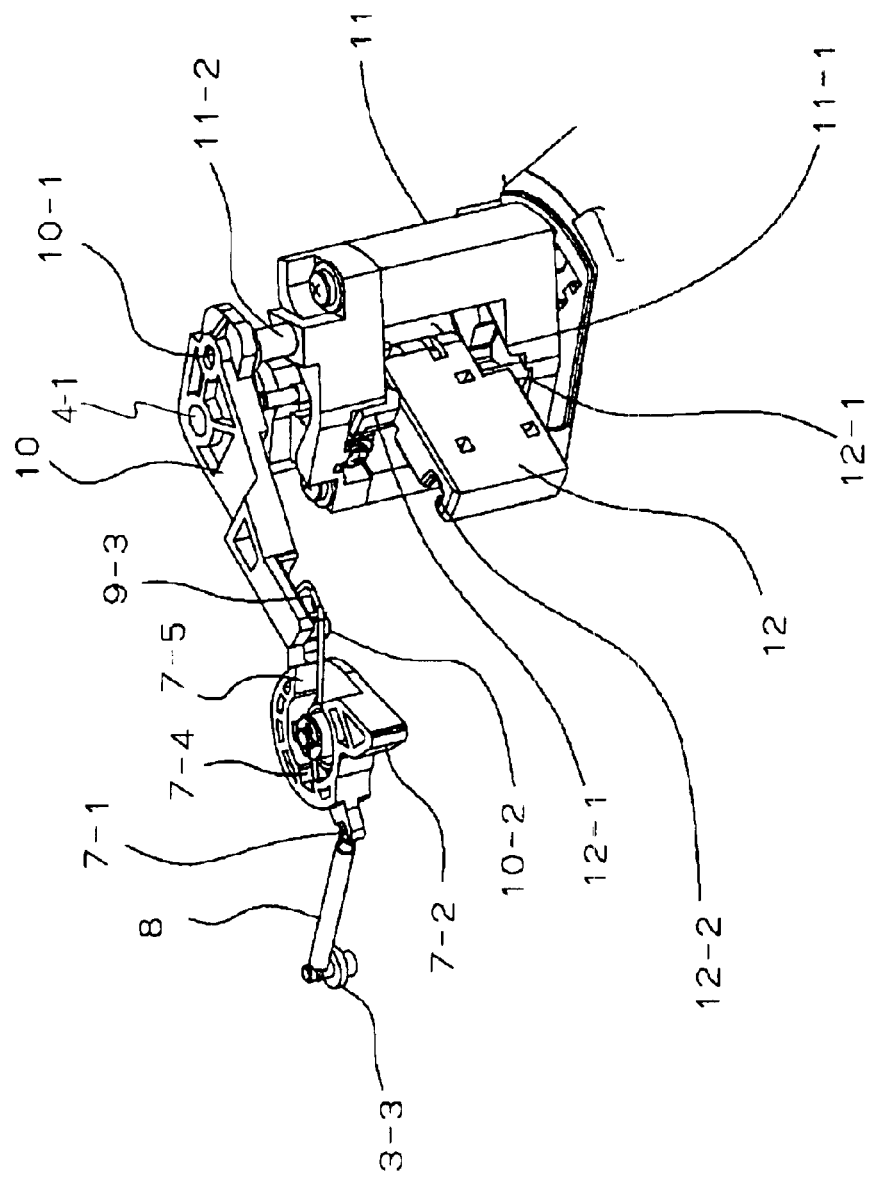
FIG. 9 is a perspective view showing the connecting relation between a rotator cam and a rotator lever and between a leader block picker and a leader block (the state before proceeding to the capture operation)

FIG. 6 is a plan view showing the cartridge magnetic tape device according to the embodiment without the casing and FIG. 7 is a perspective view showing the cartridge magnetic tape device according to the embodiment. FIG. 8 specifically shows an enlarged view of the structure in the periphery of the rotator cam 7. FIG. 9 shows a specific perspective view of mutual connecting relation between each part between the rotator cam 7 and the rotator lever 10 and between the leader block picker 11 and the leader block 12.

As shown in FIG. 7, a loader frame 3 and a cam plate 4 are placed, respectively, in the positions on the top face of a deck base 2. The loader frame 3 is placed on the front side of the inserting direction of the magnetic tape 1 and the cam plate 4 is placed on the inner side of the inserting direction of the magnetic tape 1.

Further, each of pins 3-1, 3-2, 3-3 is provided on the top face of the loader frame 3 as shown in FIG. 8. A loader cam gear 5 is rotatably mounted with the pin 3-1 being the center.

The loader cam gear 5 comprises a gear 5-1 in a part of the outer periphery. The loader cam gear 5 can be rotated in the forward direction (in the A direction in FIG. 6) and in the reverse direction (in the A' direction in FIG. 6) through the power of a motor 6 provided in the side face of the loader frame 3 being transmitted to the gear 5-1.

Also, as shown in FIG. 6, the loader cam gear 5 comprises a substantially rectangular shape capture cam 5-2 and a V-letter shape release cam 5-3. A notch type engagement part 5-4 is formed between the capture cam 5-2 and the release cam 5-3.

The rotator cam 7, as shown in FIG. 8, is rotatably attached to the pin 3-2 and is constantly pulled in the B direction in FIG. 8 by a spring 8 provided between the pin 3-3 on the loader frame 3 and a hole 7-1 on the rotator cam 7. The rotator cam 7 is forced to rotate in the C' direction in FIG. 8, that is, in the release direction. Here, the spring 8 constitutes an energizing device.

Further, the rotator cam 7 comprises, in the outer periphery, a first projection 7-3 engaging with the rotator lever 1 and a second projection slidably in contact with the loader cam gear 5.

Also, the coil part of a helical torsion coil spring 9 functioning as an over-rotation limiting device is supported on the rotator cam 7 by sharing the rotation center. As shown in FIG. 9, a spring arm 9-1 forming one end of the helical torsion coil spring 9 is fixed by being pressed against a slant part 7-4 of the rotator cam 7. A spring arm 9-2 forming other end of the helical torsion coil spring 9 is pressed against a slant part 7-5 of the rotator cam 7 by the elastic force accumulated in the coil part.

The leader block picker 11 is rotatably mounted on the deck base 2 and the operational rotation angle is limited by a rotation stopper on the deck base 2.

Figure 10:
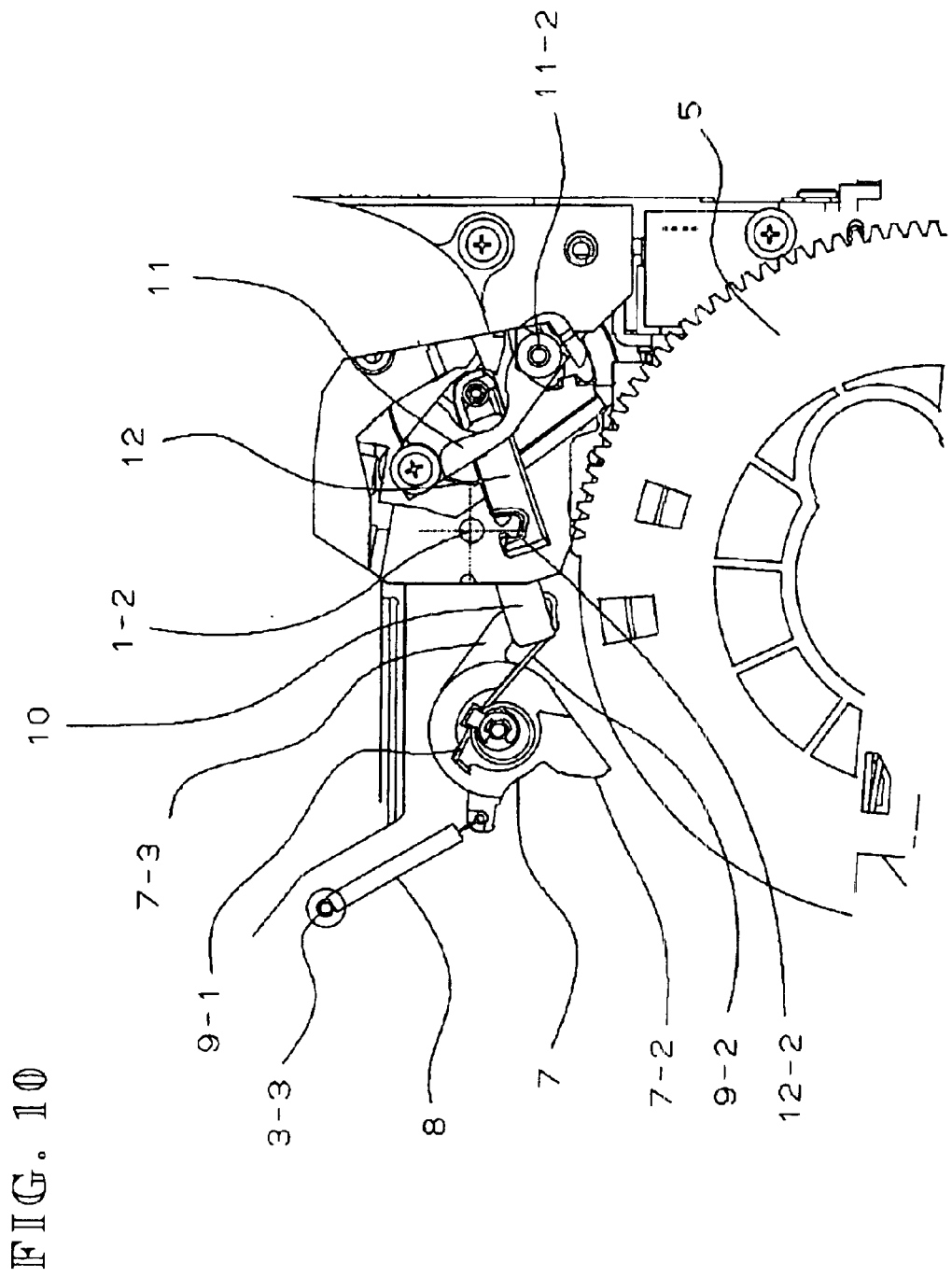
FIG. 10 is an illustration showing the mounting state of the leader block picker on the deck base by cutting out a part of a loader frame and a cam plate, which shows the rotation limit of the leader block picker in the release direction restricted by a rotation stopper.
Figure 15:
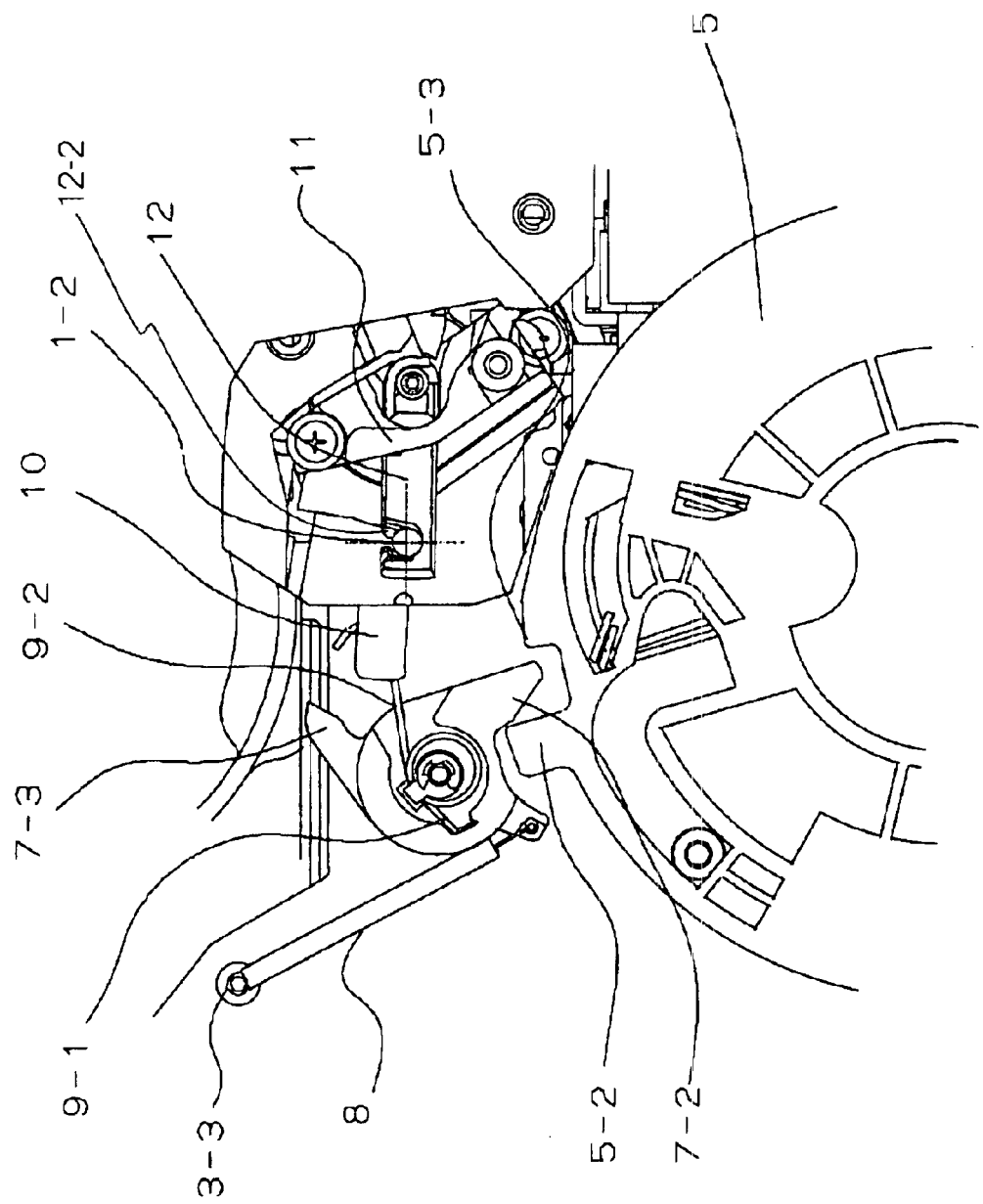
FIG. 15 is an illustration showing the mounting state of the leader block picker on the deck base by cutting out a part of a loader frame and a cam plate, which shows the rotation limit of the leader block picker in the capture direction restricted by a rotation stopper.

FIG. 10 shows the state of mounting the leader block picker 11 on the deck base 2 by cutting out a part of the loader frame 3 and the cam plate 4. The posture of the leader block picker 11 shown in FIG. 10 is the rotation limit (rotation end position) of the leader block picker 11 in the release direction limited by the rotation stopper. Also, the posture of the leader block picker 11 shown in FIG. 15 shows the rotation limit (rotation end position) of the leader block picker 11 in the capture direction limited by the rotation stopper.

Further, the leader block picker 11 comprises a guide groove 11-1 as shown in FIG. 9 to be mutually engaged with the projection 12-1 provided on top and bottom faces of the leader block 12 which is driven by a known device along a guide groove 4-2 on the cam plate 4.

The leader block 12 comprises a hook part 12-2 in the tip for capturing the leader pin 1-2. The hook part 12-2 is formed towards the upper and lower direction of the leader block 12. When the leader block 12 picks up the leader pin 1-2 and moves from E to E' direction in FIG. 6 along the guide groove 4-2 on the cam plate 4, the magnetic tape 1-1 can be taken out from the cartridge 1. This motion is the so-called threading.

As shown in FIG. 9, the leader block picker 11 comprises a pin 11-2 on the top face. The rotator lever 10 is rotatably attached to a boss 4-1 on the cam plate 4. The pin 11-2 of the leader block picker 11 is engaged with a hole 10-1 of the rotator lever 10. The rotator lever 10 and the leader block picker 11 are supported by the same rotating shaft so that the rotary motion of the rotator lever 10 and the leader block picker 11 relates to each other. Therefore, as shown in FIG. 9, FIG. 10 or the like, in the state where the leader block 12 is set in the capture position to be housed inside the leader block picker 11, the rotator lever 10, the leader block picker 11 and the leader block 12 are to rotate integrally.

As shown in FIG. 8, the rotator lever 10 comprises a projection 10-2 facing downward in its tip part. A hook part 9-3 is formed in the tip of a spring arm 9-2 of the helical torsion coil spring 9 mounted on the rotator cam 7. The projection 10-2 of the rotator lever 10 is placed to be sandwiched in between the hook part 9-3 of the spring arm 9-2 and the first projection 7-3 of the rotator cam 7.

That is, the first projection 7-3 of the rotator cam 7 is engaged with the projection 10-2 in the tip of the rotator lever 10 from the direction of releasing the rotator lever 10, i.e. from the direction of rotating in D' direction in FIG. 8. Further, the hook part 9-3 of the helical torsion coil spring 9 as an over-rotation limiting device is engaged with the projection 10-2 of the rotator lever 10 with elasticity from the direction of capturing the rotator lever 10, i.e. from the direction of rotating in D direction in FIG. 8. In the engaged state, the hook part 9-3 of the coil spring 9 and the projection 7-3 of the rotator cam 7 hold the projection 10-2 of the rotator lever 10.

The rotator cam 7 is constantly pulled in the B direction in FIG. 8 by a spring 8 as an energizing device so that the rotator cam 7 is constantly energized to rotate in the C' direction in FIG. 8, i.e. in the release direction. Thus, the fist projection 7-3 of the rotator cam 7 presses the projection 10-2 of the rotator lever 10 so that the rotator lever 10 rotates in the D' direction in FIG. 8. At this time, since the rotary motion of the rotator lever 10 and that of the leader block picker 11 relates to each other and the rotary motion of the leader block picker 11 in the D' direction is limited by the rotation stopper as described, rotation of the rotator cam 7 and the rotator lever 10 is stopped in the state as shown in FIG. 6 to FIG. 10.

Next, a series of operations when the leader block 12 captures the leader pin 1-2 will be described.

Upon inserting the cartridge 1 into the cartridge magnetic tape device, the motor 6 is driven and the loader cam gear 5 rotates in the forward direction, i.e. in the A direction in FIG. 6. The cartridge 1 is set in the position in a proper position, that is, in a position where the leader block 12 can capture the leader pin 1-2 using the forward torque of the loader cam gear 5 as the driving source by a known device disclosed in Japanese Unexamined Patent Publication No. 2001-118305, Japanese Unexamined Patent Publication No. 2001-135003 and the like. This operation is the so-called loading of cartridge.

Upon detecting completion of the loading, the leader block 12 moves (by the power source different from the motor 6) from the E' direction to the E direction in FIG. 6 along the guide groove 4-2 of the cam plate 4 to be positioned inside the leader block picker 11. In the positioned state, as shown in FIG. 9, the projection 12-1 of the leader block 12 is stopped by being engaged with the guide groove 11-1 of the leader block picker 11.

Then, the loader cam gear 5 further rotates in the forward direction. Thereby, the capture cam 5-2 in the outer periphery of the loader cam gear 5 becomes slidably in contact with the second projection 7-2 of the rotator cam 7 as shown, for example, in FIG. 11 to FIG. 13. In accordance with the slide-contact motion, the second projection 7-2 engages with the engagement part 5-4 and the rotator cam 7 rotates in the C direction, that is, in the capture direction in resistance to the tensile force of the spring 8 as the energizing device. Thereby, the helical torsion coil spring 9 mounted on the rotator cam 7 also rotates in the C direction. Thus, the hook part 9-3 of the helical torsion coil spring 9 presses the projection 10-2 of the rotator lever 10 and rotates the rotator lever 10 in the D direction in FIG. 11.

Figure 11:
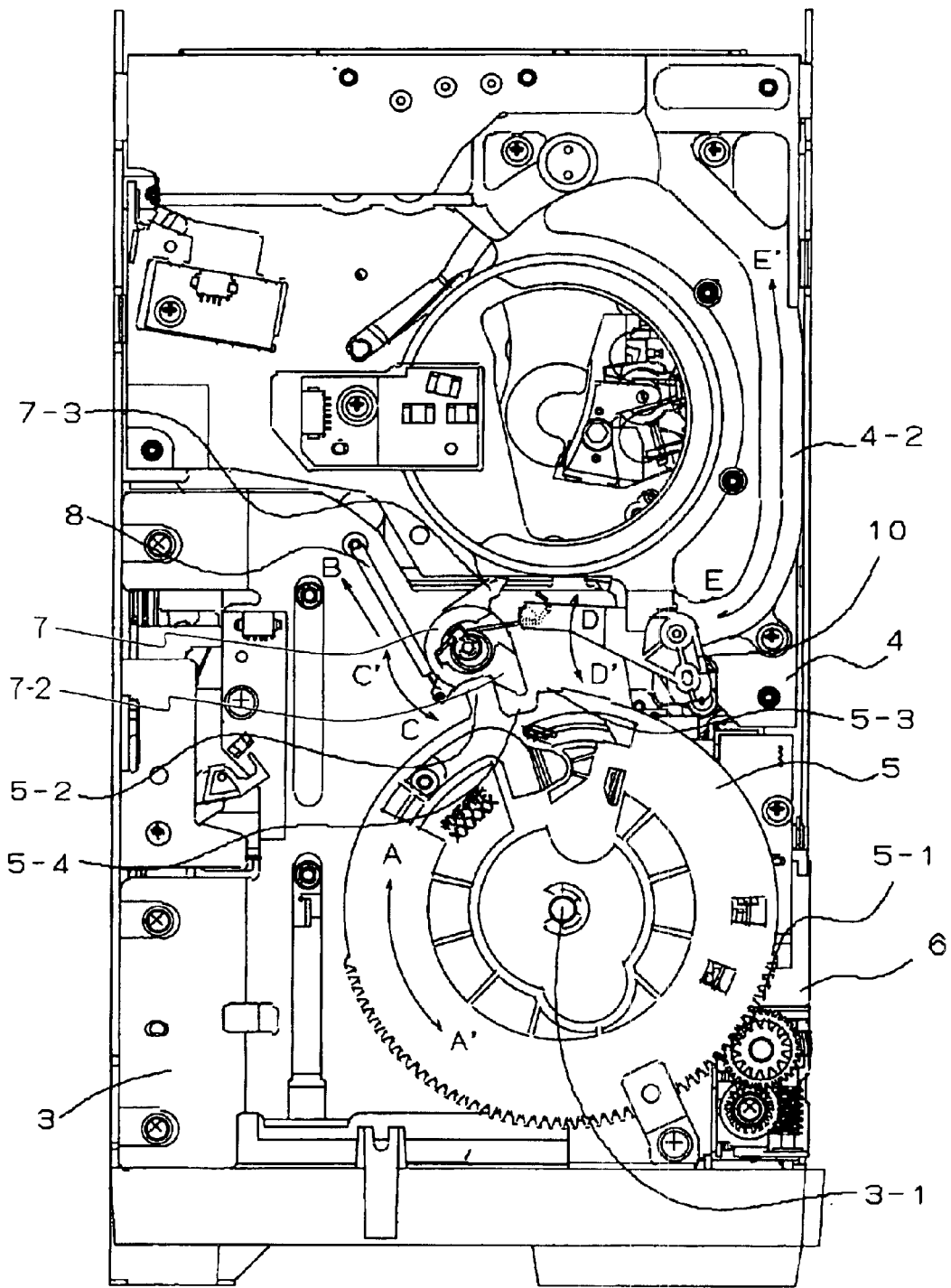
FIG. 11 is a plan view of the cartridge magnetic tape device according to the embodiment without the casing part (process of the capture operation)
Figure 12:
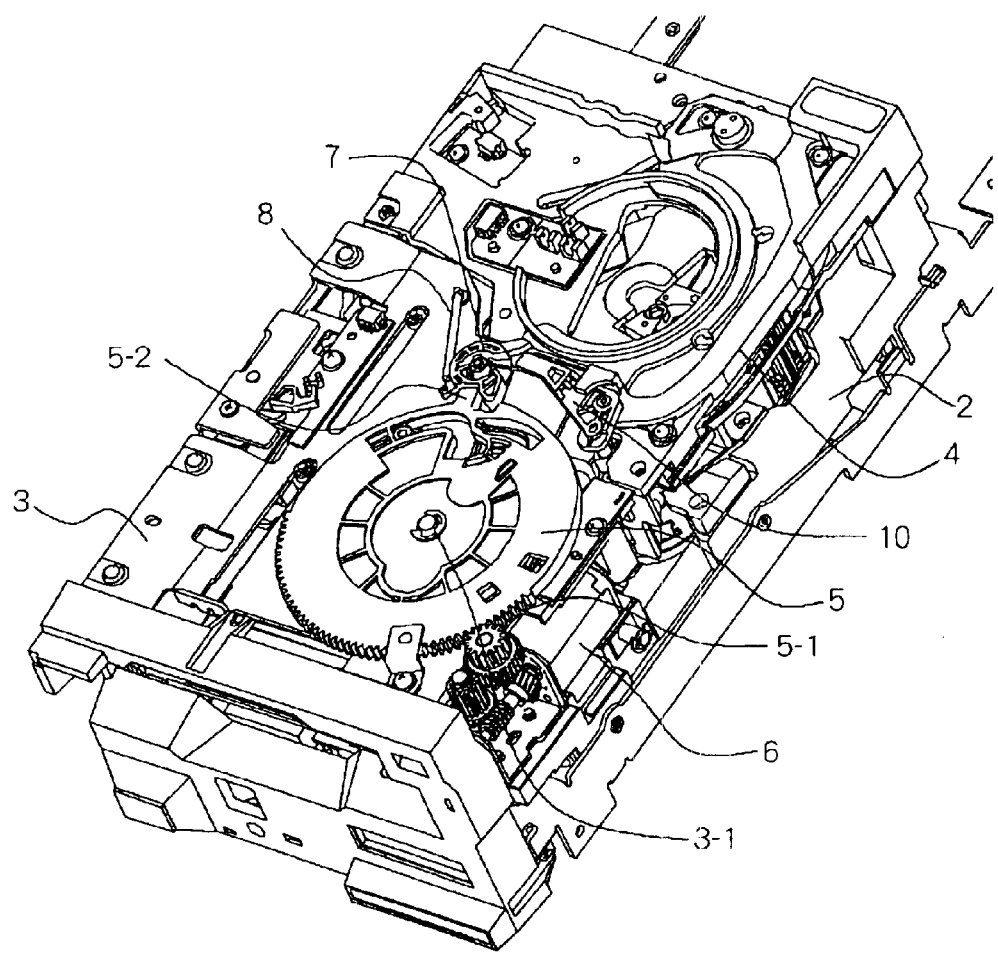
FIG. 12 is a perspective view showing the cartridge magnetic tape device according to the embodiment (process of the capture operation)

Since the rotary motion of the rotator lever 10 and the leader block picker 11 relates to each other, the leader block picker 11 also rotates in the D direction in FIG. 11 when the rotator lever 10 rotates in the D direction. In accordance with the rotation, the leader block 12 held inside the leader block picker 11 also rotates in the D direction and, as shown in FIG. 15, the leader pin 1-2 of the magnetic tape 1-1 is captured by the hook part 12-2 in the tip of the leader block 12.

Further rotation of the loader cam gear 5 in the A direction over-rotates the rotator cam 7 in the C direction. However, the operational rotation angle of the leader block picker 11 is limited to the rotation end position by the above-described rotation stopper. Therefore, the leader block picker 11, the rotator lever 10 and the leader block 12 are not to rotate beyond the limit position (rotation end position) as shown in FIG. 15.

In this case, when the loader cam gear 5 further rotates, the excessive force is to be applied to the leader block picker 11, the rotator lever 10 and the leader block 12. In the present invention, the above-described excessive force is absorbed by the helical torsion coil spring 9. That is, when a specific force or more is applied, the helical torsion coil spring 9 as the over-rotation limiting device mounted on the rotator cam 7 automatically and elastically changes its shape to be bent from the state shown in FIG. 10 to the state shown in FIG. 15. Thereby, only the rotation of the rotator cam 7 is allowed while the postures of the leader block picker 11, the rotator lever 10 and the leader block 12 are kept to the present position (rotation end position).

Therefore, even when the rotator cam 7 over-rotates or when rotation of the rotator lever 10 is interrupted due to a stuck or the like occurred at the time of capturing the leader pin 1-2, it can prevent beforehand damages on the mechanism parts such as the leader block picker 11, the rotator lever 10, leader block 12, the loader cam gear 5 and the rotator cam 7. Further, it can prevent the overload on the motor 6.

As described, over-rotation of the rotator cam 7 is not practically at issue in the structure according to the embodiment. Thus, fine adjustment in the rotation stop position of the loader cam gear 5 at the time of capture and the rotation amount of the rotator cam 7 is perfectly unnecessary.

Further, through providing such a design beforehand in which over-rotation to some extent is caused in the rotator cam 7, e.g. through over-traveling (rotating) the loader cam gear 5, mis-capture of the leader pin due to over or less rotation of the rotator cam 7 can be surely prevented.

The leader block 12 which has captured the leader pin 1-2 then moves from E to E' direction in FIG. 11 along the guide groove 4-2 on the cam plate 4 so as to perform threading operation. This operation is well known so that the description will be omitted.

Next, a series of operations at the time of releasing the leader pin 1-2 will be described. Basically, the operation at the time of release can be achieved by tracing back the operation at the time of capture as described.

Figure 14:
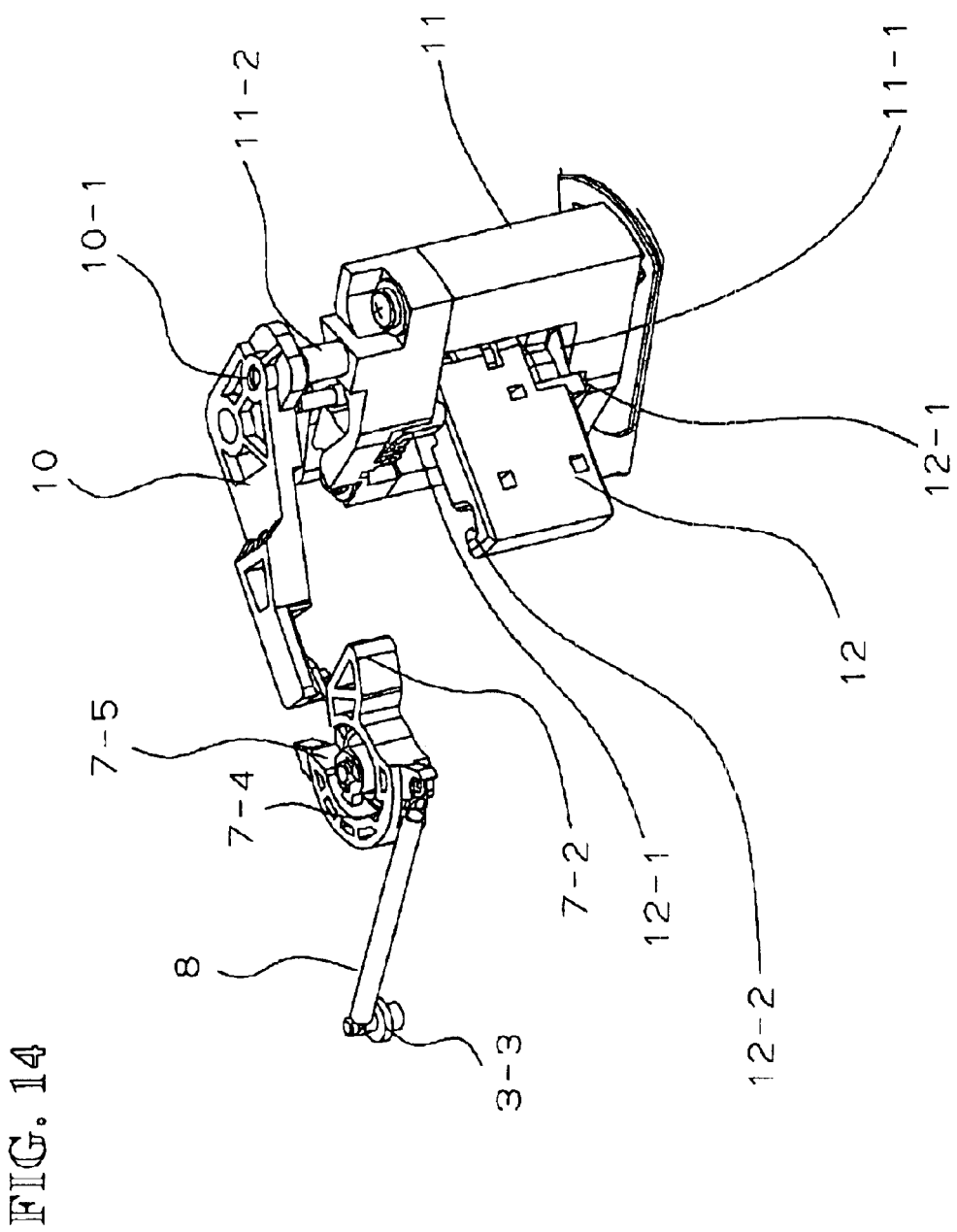
FIG. 14 is a perspective view showing the connecting relation between the rotator cam and the rotator lever and between the leader block picker and the leader block (process of the capture operation)

Specifically, first, the leader block 12 holding the leader pin 1-2 moves from E' to E direction in FIG. 11 along the guide groove 4-2 on the cam plate 4 to be set inside the leader block picker 11. Then, as shown in FIG. 14, the projection 12-1 of the leader block 12 stops by being engaged with the guide groove 11-1 of the leader block picker 11. At this stage, the leader pin 1-2 is to be set in the fixing grooves 1-3 inside the cartridge 1.

Then, the loader cam gear 5 rotates in the reverse direction, i.e. in the A' direction in FIG. 11, so that the support of the capture cam 5-2 which keeps to rotate the rotator cam 7 in the C direction in FIG. 11 by pressing the second projection 7-2 of the rotator cam 7 is removed. Thereby, the rotator cam 7 is pulled by the spring 8 in the B direction in FIG. 11 and the rotator cam 7 rotates in the C' direction in FIG. 11.

Even when the leader pin 1-2 bites on the hook part 12-2 of the leader block 12 or the like and rotation of the leader block picker 11 and the rotator lever 10 is interrupted so that the rotary motion of the rotator cam 7 in the C' direction gets stuck, the release cam 5-3 of the loader cam gear 5 becomes slidably in contact with the second projection of the rotator cam 7 by pressing the projection 7-2 so as to rotate the rotator cam 7 in the C' direction. Thus, the rotator cam 7 can be forcibly rotated in the C' direction.

Figure 13:
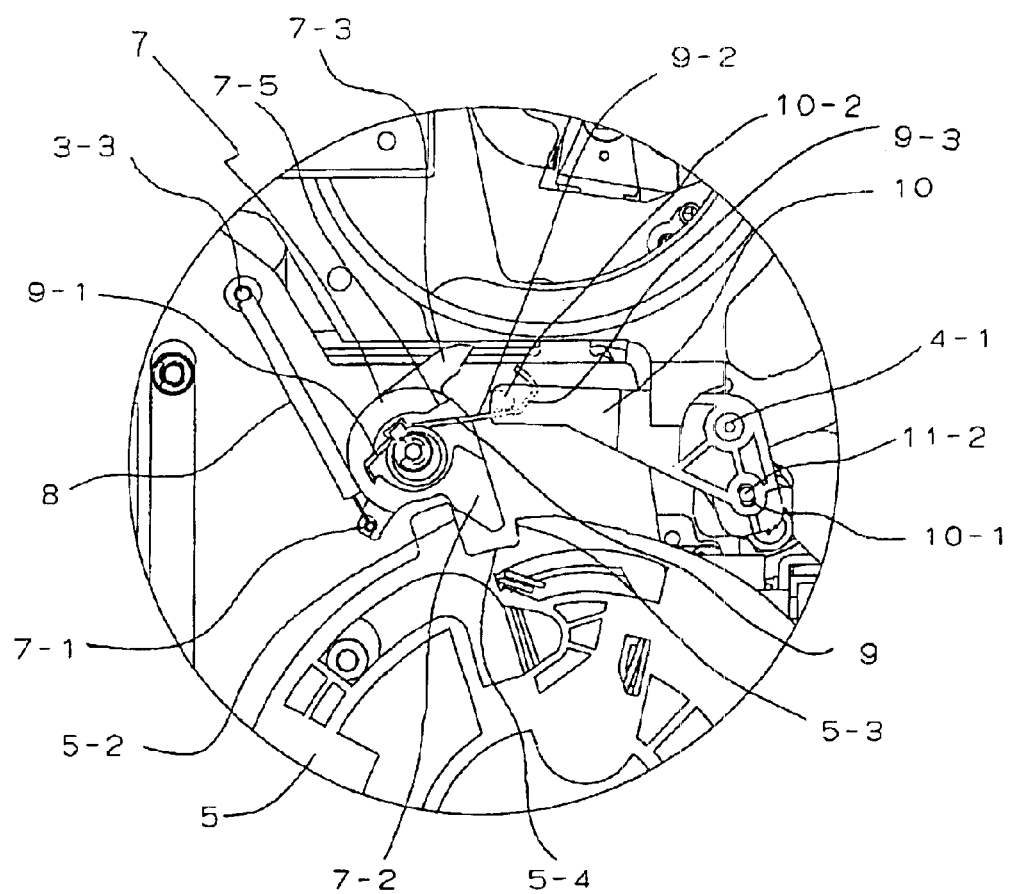
FIG. 13 is an enlarged view showing the structure in the periphery of the rotator cam of the cartridge magnetic tape device according to the embodiment (process of the capture operation)

What is more, when the rotation is stuck due to bite of the leader pin 1-2 or the like, it actually starts to affect the rotary motion of the rotator cam 7 in the C' direction after the first projection 7-3 of the rotator cam 7 comes to be in contact with the projection 10-2 in the tip of the rotator lever 10 from the rotating direction at the time of release. Thus, at least until the first projection 7-3 comes to be in contact with the projection 10-2, the rotator cam 7 can be easily rotated in the release direction as in the C' direction only through the rotation energizing force by the spring 8 as the energizing device irrespective of whether or not the rotation is stuck. At the stage when the first projection 7-3 abuts onto the projection 10-2, the second projection 7-2 has already gone into the position where the second projection 7-2 of the rotator cam 7 can be abutted onto the release cam 5-3, i.e. in the position of the engagement part 5-4 as shown in FIG. 13. Therefore, by the reverse rotation of the loader cam gear 5 in the A' direction, the second projection 7-2 of the rotator cam 7 is surely abutted onto the release cam 5-3. Thus, it can forcibly rotate the rotator cam 7 in the C' direction by the torque of the loader cam gear 5. Then, the hook part 12-2 in the tip of the leader block 12 can be removed from the leader pin 1-2 set in the pin fixing grooves 1-3 by rotating the leader block 12 through the rotator lever 10 and the leader block picker 11.

When the rotary motion of the leader block 12 advances to the position where the leader pin 1-2 is completely released from the leader block 12, the motion of the loader cam gear 5 stops once and the leader block 12 starts to move from E to E' direction in FIG. 11 along the guide groove 4-2 on the cam plate 4. Thereby, the leader block 12 comes out of the leader block picker 11 so that the loader cam gear 5 starts to rotate in the A' direction again moving the cartridge 1 to the cartridge inserting port. Thereby, unloading of the cartridge 1 is completed.

In the leader block rotary mechanism for the cartridge magnetic tape device according to the present invention, an over-rotation limiting device is provided in the rotator cam for allowing the over-rotation of the rotator cam in the capture direction. Thus, when the rotator cam over-rotates or the rotation of the rotator lever is interrupted due to a stuck or the like occurred at the time of capture, there is no excessive force worked on the mechanism parts. As a result, it can surely prevent damages on the mechanism parts such as the rotator lever, the leader block picker, the leader block and the like and also on the motor as the driving force.

Further, it becomes possible to make a design for over-rotating the rotator cam so that fine adjustment of the rotation amount of the loader cam gear and the rotator cam (members in place for the conventional retractor cam and the like) becomes unnecessary. Moreover, it can overcome the mis-capture of the leader pin due to over/less rotation of the rotator cam.

Further, the release cam is also provided in the outer periphery of the loader cam gear for rotating the rotator cam in the release direction by the reverse-rotation of the loader cam gear. Therefore, even in the case where the rotation energizing force by the energizing device of the rotator cam becomes relatively insufficient when the rotation is stuck or the like at the time of release, the rotator cam can be surely rotated in the release direction and the hook part in the tip of the leader block can be released from the leader pin of the magnetic tape.

Furthermore, the rotator cam is formed to be capable of abutting onto the release cam in the position where it can be returned only by the rotation energizing force by the energizing device irrespective of whether or not the rotation is stuck. Therefore, even when the rotation is stuck at the time of release, the rotator cam can be surely rotated in the release direction by the torque of the loader cam gear for releasing the hook part in the tip of the leader block from the leader pin of the magnetic tape.

What is claimed is:

1. A leader block rotary mechanism for a cartridge magnetic tape device, comprising:

a leader block having a hook part for capturing a leader pin of a magnetic tape housed in a cartridge;

a leader block picker for capturing the leader pin onto the hook part by holding and rotating the leader block set in a position for capturing the leader pin;

a rotator lever integrally rotating with the leader block picker;

a rotator cam for driving to rotate the rotator lever; and a loader cam gear for driving to rotate the rotator cam, wherein:

the rotator cam, while comprising an over-rotation limiting device, is constantly energized to rotate in the direction where the leader pin is released from the hook part so as to give torque to the rotator lever in the release direction;

the over-rotation limiting device transmits the torque of the rotator cam in the capture direction to the rotator lever and also allows rotation of the rotator cam while keeping the rotator lever, the leader block picker and the leader block at the rotation end position; and the loader cam gear, by forward rotation, rotates the rotator cam in the capture direction in resistance to the torque given to the rotator cam in the release direction.

2. The leader block rotary mechanism for a cartridge magnetic tape device, as claimed in claim 1, wherein the loader cam gear is provided with a function of, by reverse rotation, forcibly rotating the rotator cam in the release direction.

3. The leader block rotary mechanism for a cartridge magnetic tape device, as claimed in claim 1, wherein the rotator cam comprises:

a first projection engaging with a projection in the tip of the rotator lever from the direction of releasing the rotator lever;

the over-rotation limiting device mounted on the rotator cam for holding the projection in the tip of the rotator lever along with the first projection by being elastically engaged with the projection of the rotator lever from the capture direction of the rotator lever; and a second projection slidably in contact with the loader cam gear.

4. The leader block rotary mechanism for a cartridge magnetic tape device, as claimed in claim 1, wherein the loader cam gear comprises a capture cam which comes to be slidably in contact with the second projection by forward rotation of the loader cam gear so as to rotate the rotator cam in the capture direction.

5. The leader block rotary mechanism for a cartridge magnetic tape device, as claimed in claim 4, wherein the loader cam gear comprises a release cam which comes to be slidably in contact with the second projection by reverse rotation of the loader cam gear so as to rotate the rotator cam in the release direction.

6. The leader block rotary mechanism for a cartridge magnetic tape device, as claimed in claim 5, wherein the rotator cam is so formed that the second projection is set in a rotating position capable of abutting onto the release cam at the stage where the first projection comes to be in contact in the first place with the projection in the tip of the rotator lever from the rotation direction at the time of release.

7. The leader block rotary mechanism for a cartridge magnetic tape device, as claimed in claim 1, wherein the over-rotation limiting device is formed with a helical torsion coil spring whose coil part is supported on the rotation center of the rotator cam and one end is fixed to the rotator cam.

* * * * *